F. A. JIMERSON.
BIT CHUCK RETAINER.
APPLICATION FILED NOV. 9, 1920.

1,412,469.

Patented Apr. 11, 1922.

INVENTOR
Francis A. Jimerson
BY
Herbert G. Ogden
his ATTORNEY

UNITED STATES PATENT OFFICE.

FRANCIS A. JIMERSON, OF ATHENS, PENNSYLVANIA, ASSIGNOR TO INGERSOLL-RAND COMPANY, OF JERSEY CITY, NEW JERSEY, A CORPORATION OF NEW JERSEY.

BIT-CHUCK RETAINER.

1,412,469.   Specification of Letters Patent.   Patented Apr. 11, 1922.

Application filed November 9, 1920. Serial No. 422,846.

*To all whom it may concern:*

Be it known that I, FRANCIS A. JIMERSON, a citizen of the United States, and a resident of Athens, county of Bradford, State of Pennsylvania, have invented certain new and useful Improvements in Bit-Chuck Retainers, of which the following as a specification.

This invention relates to bit chucks, but especially to a device for retaining the tapered shank of a wood bit chuck in the tapered socket of a spindle. The device is particularly applicable to a bit chuck having a reduced shank formed with a standard Morse taper, and adapted to fit a correspondingly tapered socket in a spindle, although the invention is not limited to a device having a shank and socket provided with a Morse taper.

The primary object of the present invention is to improve upon the devices heretofore in use for retaining the shank of the chuck firmly in the socket, and also enable the retaining device to act as a ready and convenient jack or means for pulling or forcing the shank of the chuck out of the spindle socket, when changing or renewing the chuck.

Figure 1:
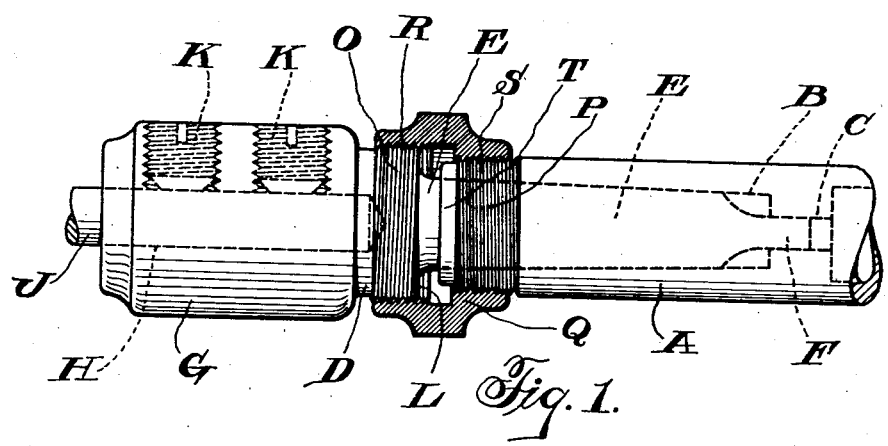

One preferred form of the invention is illustrated in the accompanying drawings, in which, Figure 1 is a side view of a spindle and chuck with the bit chuck nut forming part of the subject matter of this invention shown in vertical longitudinal section.

Figure 2:
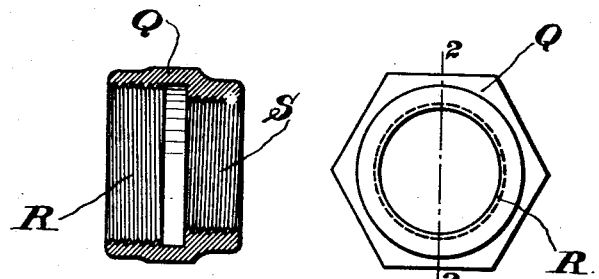
Figure 3:
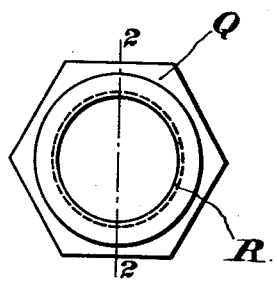

Figure 2 is a detail view of the nut in vertical longitudinal section on the line 2—2 of Figure 3, and Figure 3 is a detail end view of the nut.

Referring to the drawings, a portion of a spindle A is shown provided with a tapered cylindrical socket B preferably a Morse taper, and also having a rectangular recess C at the back end to receive the tongue of the tapered cylindrical shank of the device adapted to be held in the spindle. In this instance, a bit chuck D is provided with the reduced shank E at one end adapted to fit the spindle socket B and the tongue F of the shank enters and closely fits the recess C. The other end or body portion G of the bit chuck is provided with a bit socket H adapted to receive the bit J shown broken away, and suitable set screws K or other devices hold the bit in the bit socket.

As shown, the bit chuck D is provided with the shoulder L adjacent the base of the tapered shank E and this shoulder as well as the outer end of the spindle A are formed with the external reversely screw threaded portions O and P for a relatively short distance, the screw threaded portion O being of greater diameter than the portion P. A bit chuck retaining nut Q is provided with the internal reversely threaded portions R and S of different diameter and separated from each other, these threaded portions being adapted to cooperate with the threaded portions O and P of the chuck and spindle respectively, and when the parts are assembled with the shank E of the chuck in the tapered socket B of the spindle, the shoulder L of the chuck and the outer end T of the spindle are spaced apart as indicated in Figure 1. Be turning the bit chuck nut Q in one direction, the parts will tighten and the shank E is drawn tightly into the tapered socket in the spindle and held firmly in position. The shank E has a limited inward movement owing to its taper and until the shank is tight in the tapered socket, and this limit of inward movement is substantially reached when the outer end of the internally threaded portion S of the nut Q reaches the terminus of the externally threaded portion P of the spindle A. Wear of the internal parts will thus have no appreciable effect on the tightening adjustment of the members. By turning the nut Q in the opposite direction, the nut acts as a jack or device for pulling or forcing the shank of the chuck out of the tapered socket in the spindle.

The device is simple and cheap to manufacture, easily adjusted and has operated satisfactorily in actual practice in holding the tapered shank of the chuck in the tapered socket of the spindle, especially in those cases in which both the socket and the shank are formed with a standard Morse taper.

I claim:

A bit chuck retaining device comprising a spindle provided with a tapered cylindrical socket and a rectangular recess at the back end of the socket, a bit chuck provided with a reduced and tapered cylindrical shank at one end, adapted to fit said spindle socket and having a tongue adapted to enter said rectangular recess in the spindle, the other end of the bit chuck being provided with a bit socket, the outer end of the spindle and the opposed shoulder of the bit chuck being spaced apart when the shank is in final position in the spindle socket and each also being externally and reversely screw threaded for a relatively short distance, the screw threaded portion of one of said opposed members being of greater diameter than the other, and a bit chuck nut having internal reversely screw threaded portions of different diameter separated from each other proportionately to the extent of final separation of the said externally threaded portions of the spindle and bit chuck, whereby the shank of the chuck may be drawn tightly into and held in the tapered spindle socket or forced out of the socket in accordance with the direction of rotation of the said nut.

In testimony whereof I have signed this specification.

FRANCIS A. JIMERSON.